United States Patent
Kacelenga et al.

(10) Patent No.: US 12,265,434 B2
(45) Date of Patent: Apr. 1, 2025

(54) DISREGARDING SPURIOUS POWER-ON AND POWER-OFF TRIGGERS

(71) Applicant: DELL PRODUCTS L.P., Round Rock, TX (US)

(72) Inventors: Ray V. Kacelenga, Cedar Park, TX (US); Isaac Q. Wang, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 33 days.

(21) Appl. No.: 18/174,897

(22) Filed: Feb. 27, 2023

(65) Prior Publication Data

US 2024/0288917 A1    Aug. 29, 2024

(51) Int. Cl.
G06F 1/26    (2006.01)

(52) U.S. Cl.
CPC .................. G06F 1/26 (2013.01)

(58) Field of Classification Search
CPC ........................................... G06F 1/26
See application file for complete search history.

(56) References Cited

U.S. PATENT DOCUMENTS

| | | | | |
|---|---|---|---|---|
| 5,303,171 A * | 4/1994 | Belt | ............ | G06F 1/24 713/321 |
| 6,897,850 B2 * | 5/2005 | Sugimoto | ............ | G06F 1/1671 345/169 |
| 7,065,638 B1 * | 6/2006 | Chlytchkov | ............ | G06F 9/4411 713/1 |
| 11,119,547 B2 | 9/2021 | Wang | | |
| 11,500,427 B1 | 11/2022 | Wang et al. | | |
| 2004/0163005 A1 * | 8/2004 | Kardach | ............ | G06F 1/3203 713/323 |
| 2004/0227407 A1 * | 11/2004 | Nagai | ............ | G06F 1/1616 307/112 |
| 2005/0278557 A1 * | 12/2005 | Asoh | ............ | G06F 1/1616 713/300 |
| 2007/0075965 A1 * | 4/2007 | Huppi | ............ | H04M 1/72454 345/156 |
| 2010/0223026 A1 * | 9/2010 | Witte | ............ | G06F 1/3218 702/150 |
| 2013/0007496 A1 * | 1/2013 | Tamura | ............ | G06F 1/1677 713/323 |
| 2013/0097444 A1 * | 4/2013 | Hoagland | ............ | G06F 1/3206 713/323 |
| 2015/0029563 A1 * | 1/2015 | Tao | ............ | H04N 1/00554 358/474 |
| 2015/0097788 A1 * | 4/2015 | Sip | ............ | G06F 1/3262 345/173 |
| 2017/0010657 A1 * | 1/2017 | Schneider | ............ | G06F 1/3206 |
| 2018/0039250 A1 * | 2/2018 | Liang | ............ | G06F 1/1681 |
| 2020/0326767 A1 * | 10/2020 | Iyer | ............ | G06F 1/3215 |
| 2020/0349251 A1 * | 11/2020 | Iyer | ............ | G06F 21/85 |
| 2021/0096606 A1 * | 4/2021 | Hamlin | ............ | G06F 1/1616 |

(Continued)

*Primary Examiner* — Faisal M Zaman
(74) *Attorney, Agent, or Firm* — Larson Newman, LLP

(57) ABSTRACT

An information handling system detects a transition of a signal from a magnetic sensor, wherein the transition of the signal indicates a change of a lid of the information handling system from a first state to a second state. The system may determine an angle of the lid based on information from an inertial sensor, and confirm whether the lid is at the second state based on the determined angle of the lid. In response to a confirmation that the lid is at the second state, the system may perform a power sequence.

20 Claims, 7 Drawing Sheets

(56) References Cited

U.S. PATENT DOCUMENTS

| | | | |
|---|---|---|---|
| 2021/0255686 A1* | 8/2021 | Rivolta | G06F 1/3206 |
| 2022/0308639 A1* | 9/2022 | Kacelenga | G06F 1/1677 |
| 2023/0020672 A1* | 1/2023 | Srighakollapu | G08B 5/36 |
| 2024/0257519 A1* | 8/2024 | Zhang | G06V 10/147 |

* cited by examiner

DISREGARDING SPURIOUS POWER-ON AND POWER-OFF TRIGGERS

FIELD OF THE DISCLOSURE

The present disclosure generally relates to information handling systems, and more particularly relates to disregarding spurious power-on and power-off triggers.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system detects a transition of a signal from a magnetic sensor, wherein the transition of the signal indicates a change of a lid of the information handling system from a first state to a second state. The system may determine an angle of the lid based on information from an inertial sensor, and confirm whether the lid is at the second state based on the determined angle of the lid. In response to a confirmation that the lid is at the second state, the system may perform a power sequence.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
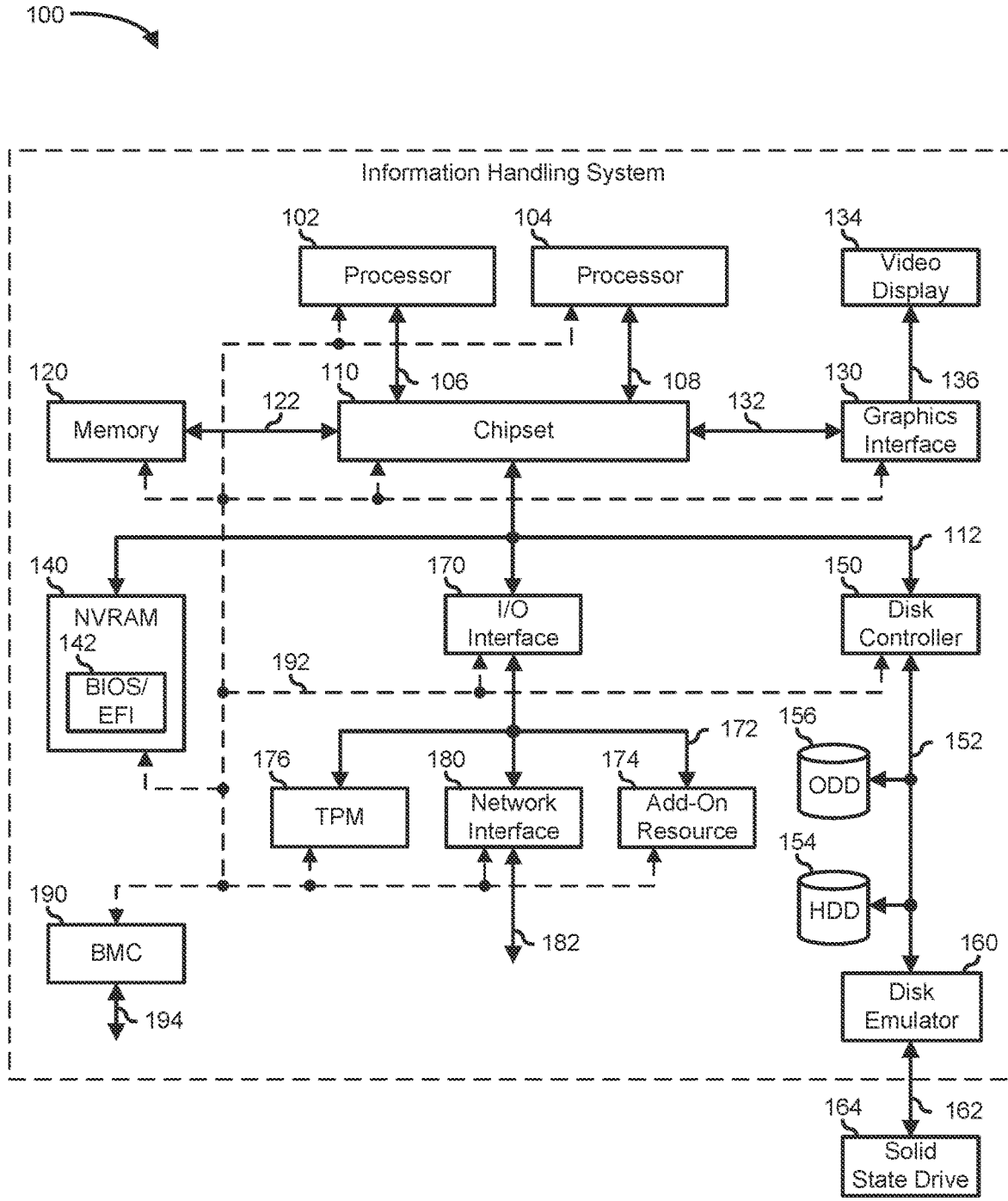
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated DellR Remote Access Controller (iDRAC).

Management interface 192 represents one or more out-of-band communication interfaces between BMC 190 and the elements of information handling system 100, and can include an I²C bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a RedfishR interface), various vendor defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, $I^2C$ and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure, information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

In some instances, information handling systems may support different physical configurations. For example, portable information handling systems like laptop computers include a base panel and a lid where the two panels may be moved relative to each other about a hinge. In a closed configuration, the two panels are moved together such that the lid is at a zero degree angle relative to the base. The lid may be moved from there through a series of open configurations.

Portable information handling systems generally include a magnetic sensor used to detect when a lid is open or closed. When the lid is open, the portable information handling system may start a power-on sequence. When the lid is closed, the portable information handling system may go to sleep or start a power-off sequence. However, when at least two information handling systems are vertically stacked, a magnetic field from a magnet of one information handling system may be detected by a sensor of another information handling system. In one scenario, a sensor may falsely detect that a lid is open in one of the information handling systems, triggering the power-on sequence, thus draining the information handling system's battery. In another scenario, a sensor may falsely detect that a lid is closed in one of the information handling systems and trigger the sleep or power-off sequence. To address these and other issues, the present disclosure provides a system and method to mitigate or disregard false automatic power-on and automatic power-off sequence of portable information handling systems.

Figure 2:
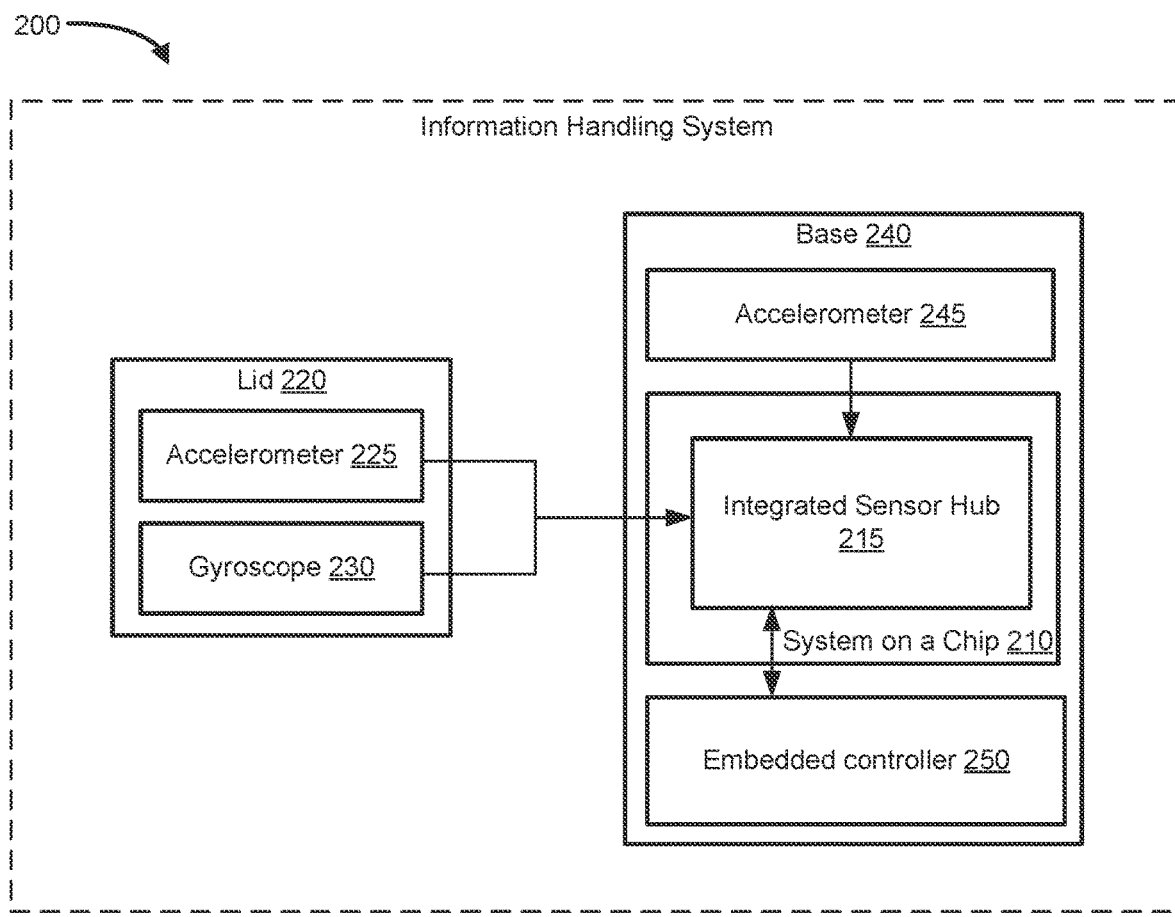
FIG. 2 is a block diagram illustrating an information handling system configured for disregarding spurious power-on and power-down triggers, according to an embodiment of the present disclosure.

FIG. 2 shows an information handling system 200 configured for disregarding spurious power-on and power-off triggers. The system and method disclosed herein incorporate information from platform inertial sensors, such as an accelerometer and a gyroscope into a decision-making process on whether the lid of the information handling system is truly open or closed. The system and method may continue or stop an initiated power sequence based on the result of the decision-making process. Information handling system 200, which is similar to information handling system 100 of FIG. 1, includes a lid 220 and a base 240. Base 240 includes an embedded controller 250 and a system on a chip 210 which further includes an integrated sensor hub 215. Embedded controller 250 is similar to BMC 190 of FIG. 1.

Lid 220 may be connected to base 240 via a hinge, such that lid 220 may be moveable relative to base 240. For example, lid 220 may be moved from a closed position to an open position at various angles relative to base 240. Lid 220 includes an accelerometer 225 and a gyroscope 230. Base 240 includes an accelerometer 245. Lid 220 and base 240 may be communicatively coupled to system on a chip 210 and further with integrated sensor hub 215.

Accelerometer 225 and gyroscope 230 may be disposed in lid 220, such as part of an inverter, a printed circuit board assembly, and other components. Accelerometer 225 may be configured to detect the acceleration of lid 220 including its relative orientation to base 240. Gyroscope 230 may be configured to detect the rotation of lid 220. Accelerometer 225 may be configured to transmit acceleration information associated with lid 220 to integrated sensor hub 215. Gyroscope 230 may be configured to transmit orientation and angular velocity information associated with lid 220 to integrated sensor hub 215.

Accelerometer 245 may be disposed in base 240, such as part of an inverter, a printed circuit board assembly, and other components. Accelerometer 245 may be configured to detect the acceleration of base 240 including its relative orientation with lid 220. Accelerometer 245 may be configured to transmit acceleration information associated with base 240 to integrated sensor hub 215. Note that any device capable of providing acceleration information for purposes described herein can be used instead of the accelerometers. Similarly, any device capable of providing orientation and angular velocity information for the purposes described herein can be used instead of the gyroscope.

System on a chip 210 may be an integrated circuit that holds one or more components such as a central processing unit and integrated sensor hub 215. Integrated sensor hub 215 may be configured to integrate data from different sensors and process them. In this example, integrated sensor hub 215 may be configured to integrate and process data from accelerometer 225, gyroscope 230, and accelerometer 245 subsequent to receiving a command to do so from embedded controller 250. In addition, integrated sensor hub 215 may be configured to integrate process data from a magnetic sensor via embedded controller 250. In particular, integrated sensor hub 215 may be configured to integrate and process acceleration information from accelerometer 225 and accelerometer 245 with orientation and angular velocity information from gyroscope 230 when requested by embedded controller 250. Integrated sensor hub 215 may be configured to determine the state of lid 220, such as whether lid 220 is truly open or closed upon receipt of a command from embedded controller 250. Integrated sensor hub 215 may transmit the result of the determination to embedded controller 250.

Figure 3:
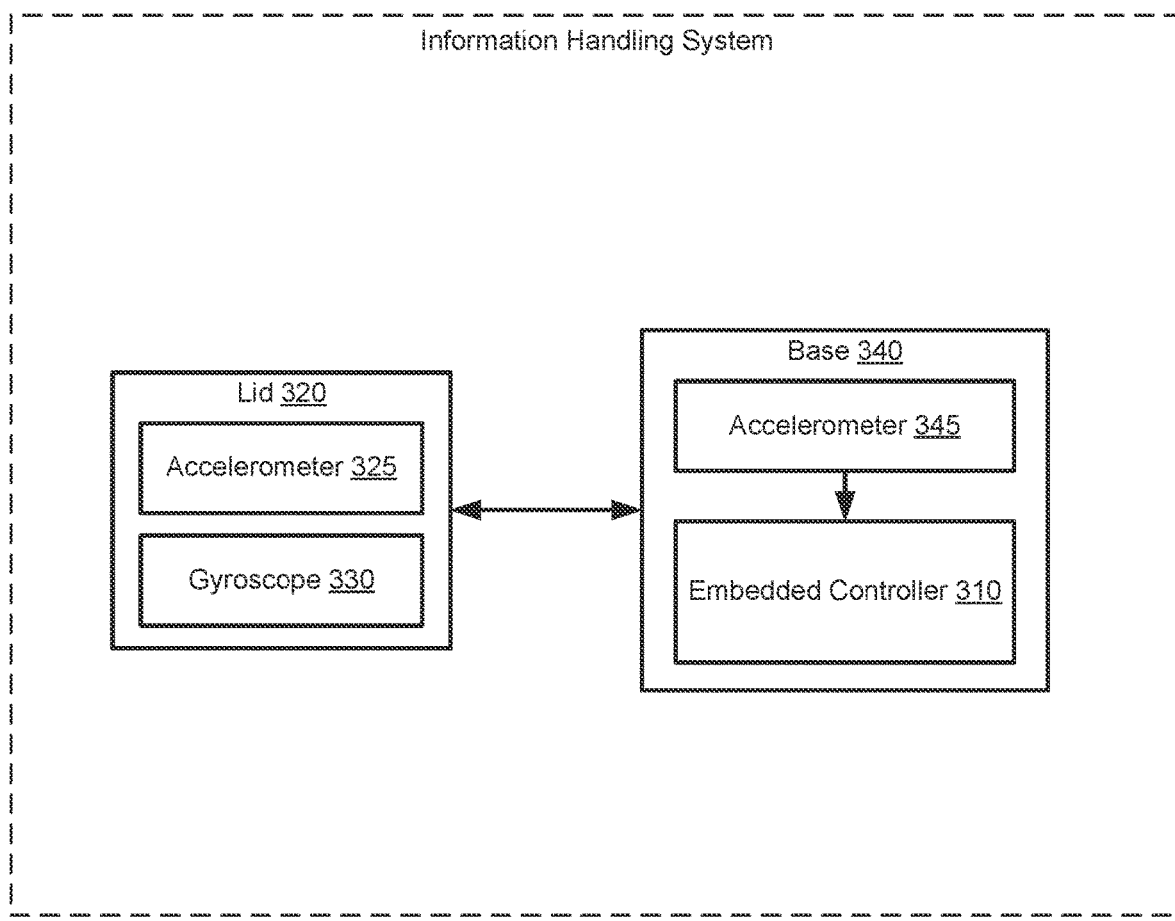
FIG. 3 is a block diagram illustrating an information handling system configured for disregarding spurious power-on or power-off triggers, according to an embodiment of the present disclosure.

FIG. 3 shows an information handling system 300 configured for disregarding spurious power-on and power-down triggers. Information handling system 300, which is similar to information handling system 100 of FIG. 1, includes a lid 320 and a base 340. Lid 320 includes an accelerometer 325 and a gyroscope 330. Base 340 includes an embedded controller 310 and an accelerometer 345. Lid 320 may be communicatively coupled to base 340 while accelerometer 345 may be communicatively coupled to embedded controller 310.

Accelerometer 325 and gyroscope 330 work in substantially the same manner as accelerometer 225 and gyroscope 230 of FIG. 2 respectively. For example, accelerometer 325 may be configured to detect the acceleration of lid 320 including its relative orientation to base 340 while gyroscope 330 may be configured to detect the rotation of lid 320. Similarly, accelerometer 345 works in substantially the same manner as accelerometer 245 of FIG. 2. For example, accelerometer 345 may be configured to detect orientation of base 340 relative to lid 320.

Embedded controller 310, which is similar to BMC 190 of FIG. 1, may be configured to integrate data from different sensors and process them. Embedded controller 310 performs substantially the same operations associated with the present disclosure as integrated sensor hub 215 of FIG. 2. For example, embedded controller 310 may be configured to integrate and process data from accelerometer 325, gyroscope 330, and accelerometer 345 to determine the state of lid 320, such as whether lid 320 is open or closed.

Figure 4:
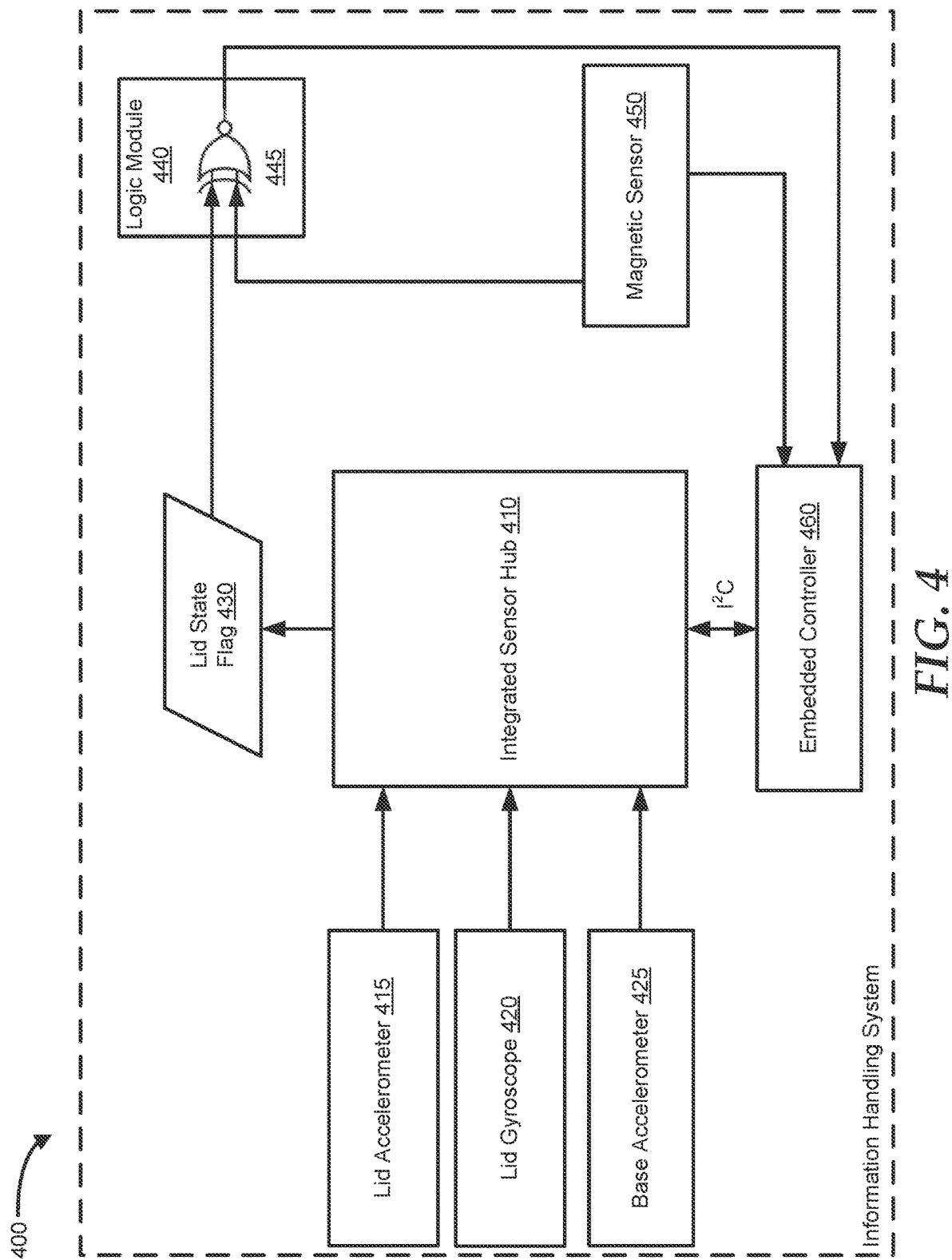
FIG. 4 is a block diagram illustrating an information handling system configured for disregarding spurious power-on and power-off triggers, according to an embodiment of the present disclosure.

FIG. 4 shows an information handling system 400 configured for disregarding spurious power-on and power-down triggers. Thus, eliminating false automated power-on and power-down operations. Information handling system 400, which is similar to information handling system 200 of FIG. 2, includes an integrated sensor hub 410, a lid accelerometer 415, a lid gyroscope 420, a base accelerometer 425, a logic module 440, a magnetic sensor 450, and an embedded controller 460. Integrated sensor hub 410 may be communicatively coupled to lid accelerometer 415, lid gyroscope 420, base accelerometer 425, and an embedded controller 460. In particular, embedded controller 460 may be coupled to integrated sensor hub 410 via an interface, such as an I²C interface or similar, that is used to communicate information or commands between the two devices. Embedded controller 460 may also be communicatively coupled to logic module 440, wherein logic module 440 may transmit output of logic gate 445 to embedded controller 460.

Lid accelerometer 415 and lid gyroscope 420 work in substantially the same manner as lid accelerometer 325 and lid gyroscope 330 of FIG. 3 respectively. Accelerometer 325 and gyroscope 330 work in substantially the same manner as accelerometer 225 and gyroscope 230 of FIG. 2 respectively. Likewise, base accelerometer 425 works in substantially the same manner as accelerometer 345 of FIG. 3 which substantially works in the same manner as accelerometer 245 of FIG. 2. Integrated sensor hub 410 is similar to integrated sensor hub 215 of FIG. 2 while embedded controller 460 is similar to embedded controller 250 of FIG. 2.

Embedded controller 460 may send a message to integrated sensor hub 410 to determine the hinge angle upon detection of a transition of a signal received from magnetic sensor 450, such as from a logical high signal to a logical low signal, or vice versa. The transition of the signal may indicate a transition of the lid state from a first state to a second state, such as from closed to open or open to closed. The lid may be considered open when the lid angle is greater than zero degrees. The lid may be closed when the angle is zero degrees. For example, the lid may be considered open when the hinge angle is greater than a lid open angle threshold, like of 15 degrees. The lid may be considered closed when the lid angle is less than the lid closed angle threshold, like of 10 degrees. The threshold on both instances may be less than or greater than the example provided herein. The message from embedded controller 460 may direct integrated sensor hub 410 to determine whether the lid is truly open or closed. To do this, integrated sensor hub 410 may be configured to determine the angle of a hinge or a lid of information handling system 400. In other words, the determination of the current state of the lid may be triggered by a transition in the signal from magnetic sensor 450. Integrated sensor hub 410 may transmit the result of the determination to embedded controller 460. For example, integrated sensor may transmit the current state of the lid to embedded controller 460.

Integrated sensor hub 410 may update lid state flag 430 based on its determination of the state of the lid. Lid state flag 430 may be a variable that indicates the current lid state, such as whether the lid is open or closed, as determined from information transmitted by the inertial sensors as determined by integrated sensor hub 410. Accordingly, lid state flag 430 may be implemented using binary (as logical one or zero) or Boolean (as true or false) values. For example, if the lid is open then lid state flag 430 may be set to one or true. If the lid is closed, then lid state flag 430 may be set to zero or false. The lid state flag 430 may be located in an always-on power domain and may be updated each time the lid is opened or closed. The always-on power domain remains powered even when there is no AC power cord plugged in. The value of lid state flag 430 may be used to mask the signal from magnetic sensor 450 to allow the signal associated with a valid lid state and proceed with the initiated power sequence. For example, the power sequence may be a power-up sequence when the lid is open or a power-down sequence when the lid is closed. The power-up sequence may also be referred to as a power-on sequence while the power-down sequence may also be referred to as power-off sequence.

Magnetic sensor 450 may be a hall effect sensor, a giant magnetoresistance effect sensor, a magnetic proximity sensor, an ultrasound proximity sensor, a photoelectric proximity sensor, an inductive proximity sensor, a capacitive proximity sensor, or similar. Magnetic sensor 450 may be configured to transmit a logical high signal when it detects that the lid of the information handling system is open. Accordingly, magnetic sensor 450 may transmit a logical low signal when it detects that the lid is closed.

Logic module 440 includes a logic gate 445 which may be an XNOR gate. Logic gate 445 may be implemented as an integrated circuit or as a software code. Logic gate 445 may be configured to take lid state flag 430 and the output of magnetic sensor 450 as inputs. The output of logic gate 445 may be based on a truth table such as table 1 below. In particular, logic gate 445 may provide a logical high signal or one as an output if both of the inputs are at the same logical state, that is both 0's or both 1's. If one but not both of the inputs are logical high signals, logic gate 445 provides an output of a logical low signal or zero. A logical high signal output of logic gate 445 may signify a true or valid signal transition from a logical high signal to a logical low signal or vice versa of magnetic sensor 450. A logical low signal output of logic gate 445 may signify a false or invalid magnetic signal transition from a logical high signal to a logical low signal or vice versa. The output of logic gate 445 may be transmitted to embedded controller 460 which may then determine whether to continue, disregard, or stop the initiated power sequence.

TABLE 1

| Magnetic Sensor Transition | Magnetic Sensor Signal | Lid State Flag | Logic Gate Output | Action |
|---|---|---|---|---|
| 1 -> 0 | 0 | 0 | 1 | Power down |
| 1 -> 0 | 0 | 1 | 0 | No Action |
| 0 -> 1 | 1 | 0 | 0 | No Action |
| 0 -> 1 | 1 | 1 | 1 | Power Up |

A logical high signal output of logic gate 445 may indicate that the signal received from magnetic sensor 450 is true or valid, such that the lid transitioned from the first state to the second state. If so, integrated sensor hub 410 may proceed with the operation or power sequence initiated by the signal from magnetic sensor 450. However, a logical low signal output of logic gate 445 may indicate that the signal received from magnetic sensor 450 is false or invalid, such that the lid remained in the first state and did not transition to the second state. If so, integrated sensor hub 410 may stop or disregard any further operation or power sequence initiated by the signal from magnetic sensor 450 and thus eliminate spurious signals from magnetic sensor 450.

For example, if the signal from magnetic sensor 450 indicates that the lid transitioned from a closed state to an open state, but the output of logic gate 445 is a logical low signal, then embedded controller 460 may ignore the signal from the magnetic sensor 450. Embedded controller 460 may also proceed to ignore or stop the initiated power on or shutdown of the information handling system. However, if the signal from magnetic sensor 450 indicates that the lid transitioned from a closed state to an open state and the output of logic gate 445 is a logical high signal, then embedded controller 460 may proceed with an operation associated with the lid being open, such as to power-on the information handling system. Embedded controller 460 may also proceed with shutting down the information handling when the lid is closed.

Accordingly, if the signal from magnetic sensor 450 indicates that the lid transitioned from an open state to a closed state, but the output of logic gate 445 is a logical low signal, then embedded controller 460 may ignore the signal from the magnetic sensor 450. Embedded controller 460 may also proceed to ignore or stop the initiated power on or shutdown of the information handling system. However, if the signal from magnetic sensor 450 indicates that the lid transitioned from an open state to a closed state, and the output of logic gate 445 is a logical high signal, then embedded controller 460 may proceed with an operation associated with the lid being closed, such as to power off the information handling system. Thus, integrated sensor hub 410 with logic module 440 and embedded controller 460 may be configured to detect and disregard spurious signals from magnetic sensor 450, wherein the spurious signals may trigger a power-on or power off sequence.

Figure 5:
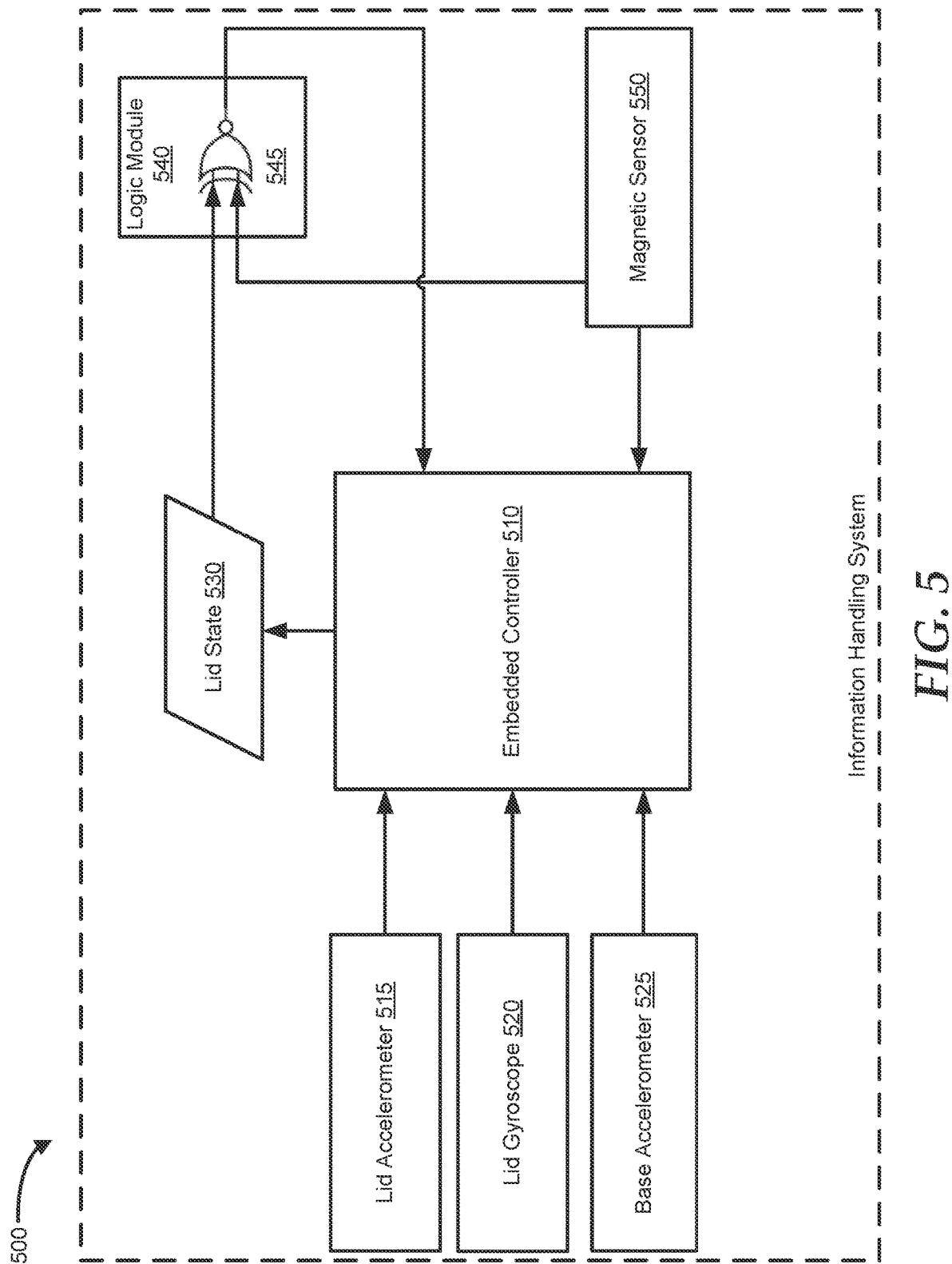
FIG. 5 is a block diagram illustrating an information handling system configured for disregarding spurious power-on and power-off triggers, according to an embodiment of the present disclosure.

FIG. 5 shows an information handling system 500 configured for disregarding spurious power-on and power-down triggers and thus eliminating false automated power-on and power-down operations. Information handling system 500, which is similar to information handling system 300 of FIG. 3, includes an embedded controller 510, a lid accelerometer 515, a lid gyroscope 520, a base accelerometer 525, a logic module 540, and a magnetic sensor 550. Embedded controller 510 may be communicatively coupled to lid accelerometer 515, lid gyroscope 520, base accelerometer 525, magnetic sensor 550, and logic module 540.

Lid accelerometer 515, lid gyroscope 520, and base accelerometer 525 work in substantially the same manner as lid accelerometer 415, lid gyroscope 420, and base accelerometer 425 of FIG. 4, respectively. Logic module 540 and logic gate 545 work in substantially the same manner as logic module 440 and logic gate 445 of FIG. 4. In addition, magnetic sensor 550 works in substantially the same manner as magnetic sensor 450 of FIG. 4. Also, lid state flag 530 is similar to lid state flag 430 of FIG. 4.

Embedded controller 510 is similar to embedded controller 310 of FIG. 3. Upon detection of a transition of the signal transmitted by magnetic sensor 550, embedded controller 510 may be configured to determine the angle of a hinge or a lid of information handling system 500 to determine the state of the lid, such as whether the lid is open or closed. The determination may be triggered by a transition of the signal from magnetic sensor 550. For example, embedded controller 510 may perform the determination when it detects that there is a transition from a logical high signal to a logical low signal or vice versa with the signal received from magnetic sensor 550. Embedded controller 510 may update lid state flag 530 based on its determination of the state of the lid. Thus, embedded controller 510 with logic module 540 may be configured to detect and disregard spurious signals from magnetic sensor 550, wherein the spurious signals may trigger a power-on or power off sequence.

Those of ordinary skill in the art will appreciate that the configuration, hardware, and/or software components of information handling systems 200, 300, 400, and 500 depicted in FIGS. 2, 3, 4, and 5 may vary. For example, the illustrative components within information handling systems 200, 300, 400, and 500 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for the continuity of the description.

Figure 6:
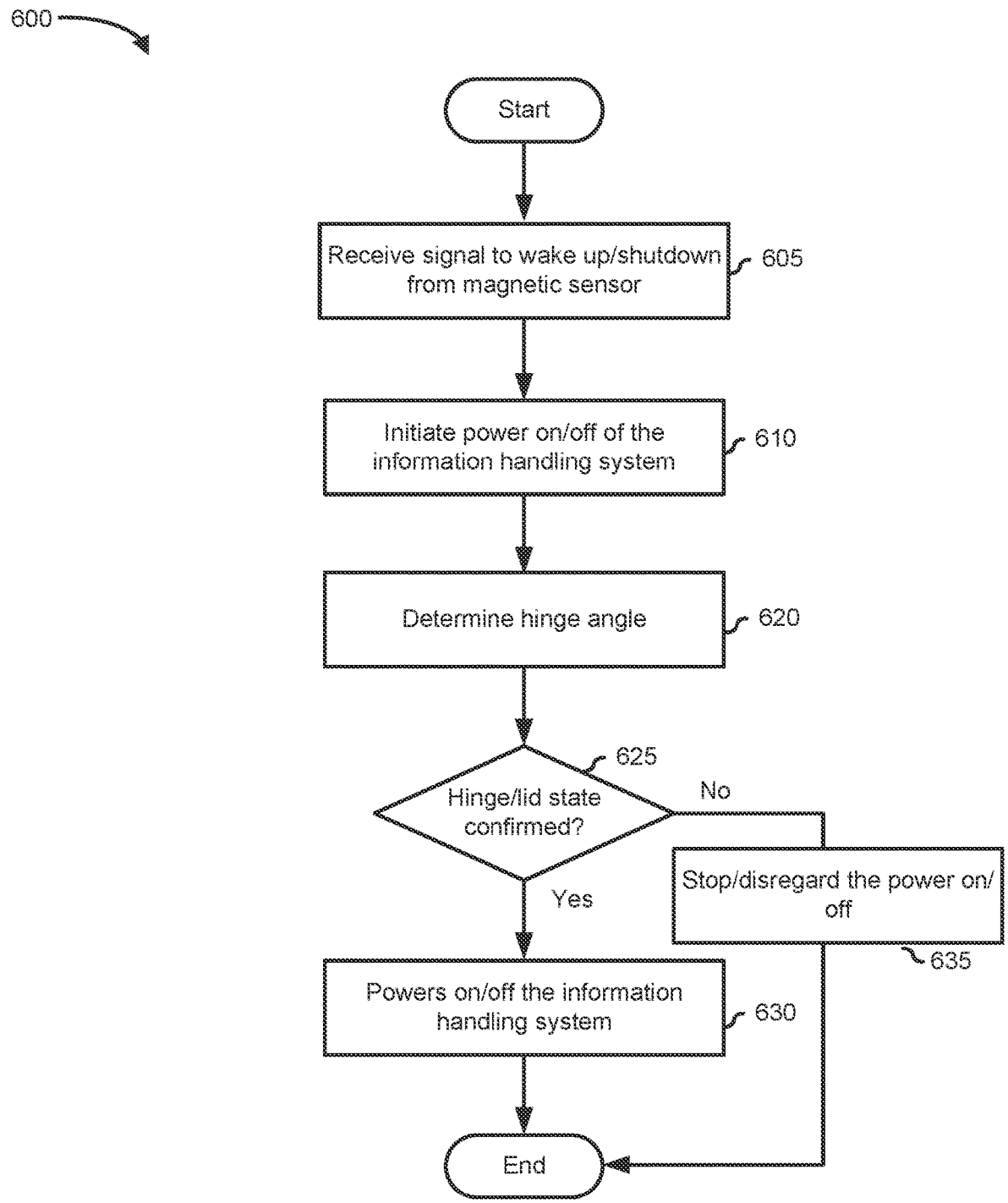
FIG. 6 is a flowchart illustrating a method for disregarding spurious power-on and power-off triggers, according to an embodiment of the present disclosure.

FIG. 6 shows a flowchart of a method 600 for disregarding spurious power-on and power-down triggers. The flowchart shows how magnetic sensor signal transitions caused by stray magnetic fields are disregarded or eliminated. Method 600 may be performed by one or more components shown in various figures. However, while embodiments of the present disclosure are described in terms of the figures shown herein, it should be recognized that other systems may be utilized to perform the described method. One of skill in the art will appreciate that this flowchart explains a typical example, which can be extended to advanced applications or services in practice.

Method 600 typically starts at block 605 where a signal to wake up or shut down the information handling system is transmitted by a magnetic sensor to an embedded controller. For example, the signal to wake up or shut down the information handling system is based on a transition of the signal from a logical low signal to a logical high signal. The transition may indicate a transition of the lid state from a first state to a second state, such as from a closed state to an open state or vice versa. The method proceeds to block 610. At block 610, the embedded controller may initiate a power on the system on a chip and the rest of the information handling system. The method proceeds to block 620, the method, or in particular the embedded controller may determine the hinge angle or the angle of the lid relative to the base. In another embodiment, the integrated sensor hub may determine the hinge angle or the angle of the lid relative to the base.

The method proceeds to decision block 625 where the method may confirm that the hinge/lid is at the second state. If the hinge or lid is at the second state, the method proceeds to the "YES" branch and the method proceeds to block 630. If the hinge or lid is not in the second state, the method proceeds to the "NO" branch, and the method proceeds to block 635 where the method may terminate or disregard the initiated power on/off of the information handling system. At block 630, the embedded controller may continue with the initiated power on/off of the information handling system. After blocks 635 and 630, the method ends.

Figure 7:
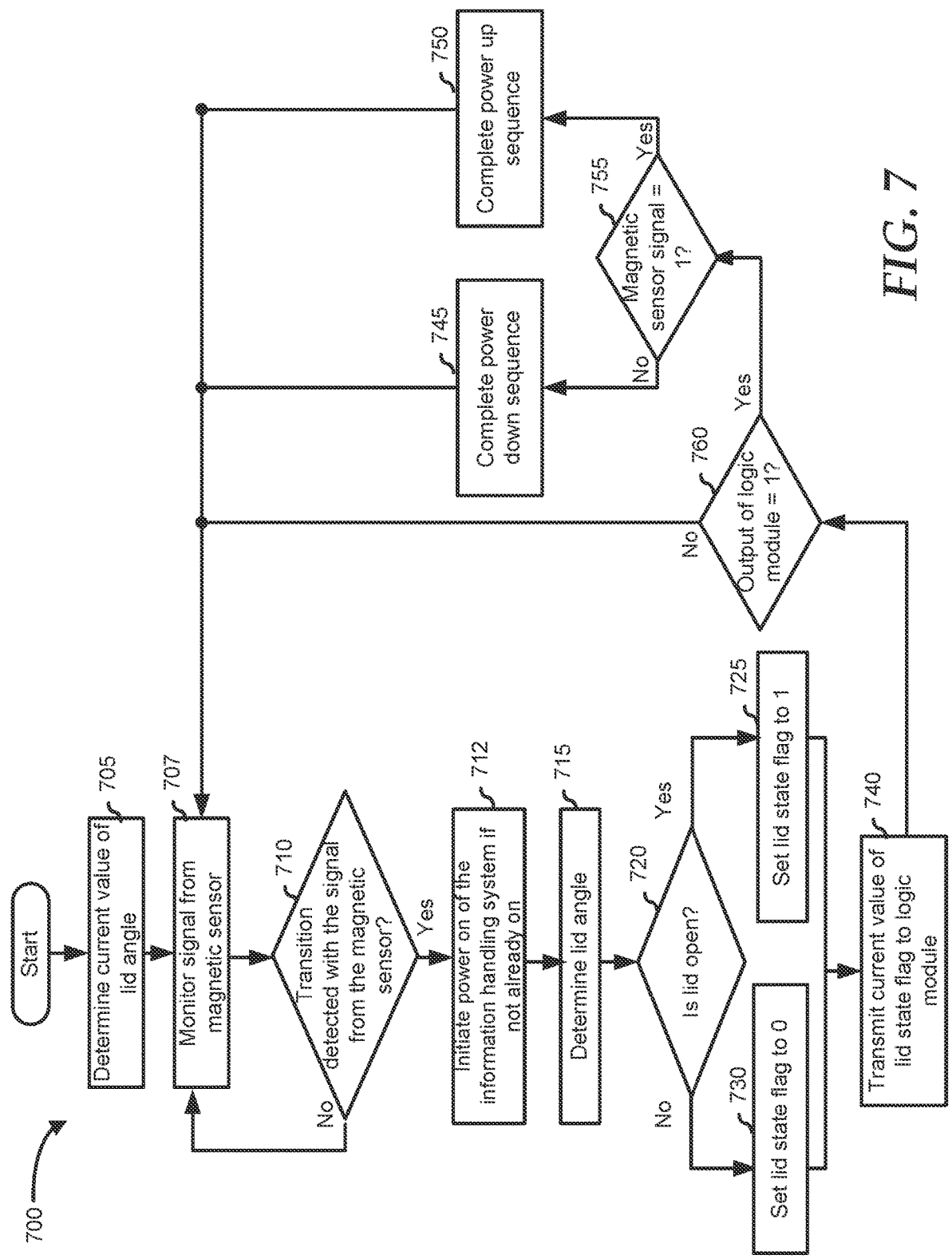
FIG. 7 is a flowchart illustrating a method for disregarding spurious power-on and power-off triggers, according to an embodiment of the present disclosure.

FIG. 7 shows a flowchart of a method 700 for disregarding spurious power-on and power-down triggers. The flowchart shows how magnetic sensor signal transitions caused by stray magnetic fields are disregarded or eliminated. Method 700 may be performed by one or more components shown in various figures. However, while embodiments of the present disclosure are described in terms of the figures shown herein, it should be recognized that other systems may be utilized to perform the described method. One of skill in the art will appreciate that this flowchart explains a typical example, which can be extended to advanced applications or services in practice.

The method typically starts at block 705 where the current value of the lid angle is determined by an integrated sensor hub or embedded controller. The method proceeds to block 707, where it monitors a signal from a magnetic sensor. The signal may be used to determine whether the lid is open or closed. The method may also compare the current signal from the previous signal to determine if there is a transition, such as from a logical high signal to a logical low signal or vice versa. The method proceeds to decision block 710, where the method determines whether there is a transition in the state of a signal received from a magnetic sensor. If a transition is detected between the previously received signal and the current signal, then the "YES" branch is taken and the method proceeds to block 712. If there is no transition detected, then the "NO" branch is taken and the method loops back to block 707.

At block 712, the method may initiate a power on of the information handling system if the information handling system is not already powered on. In one embodiment, whether the signal from the magnetic sensor transitioned from a logical low signal to a logical high signal or vice versa, the method may initiate a power on to enable the determination of the lid angle. The method proceeds to block 715. At block 715, the method may determine the hinge angle or the lid angle based on information from an accelerometer and gyroscope located in the lid and the base of the information handling system. The determination may be performed by the embedded controller or the integrated sensor hub. This is performed to cross-check or to confirm whether the lid is truly open or closed.

The method proceeds to decision block 720. At decision block 720, the method may determine whether the lid is open or closed based on the angle determined at block 715. If the lid is open, then the "YES" branch is taken and the method proceeds to block 725. If the lid is not open, then the "NO" branch is taken and the method proceeds to block 730. At block 725, the method may set the lid state flag to one or true. At block 730, the method may set the lid state flag to zero or false. The method may proceed to block 740 from blocks 730 and 725. At block 740, the method may transmit the current value of the lid state flag to a logic module, which may reside at the embedded controller. The method proceeds to decision block 760.

At decision block 760, the method determines whether the output of the logic module is equal to one or a logical high signal. The output of the logic module may be a logical high signal (1) or a logical low signal (0). If the output of the logic module is a logical high signal, then the current state of the lid is confirmed, such that the lid is truly open or truly closed. At this point, the method may proceed with the initiated power sequence. Otherwise, the output of the logic module is a logical low signal which does not confirm the current state of the lid. For example, the lid is not truly open or not truly closed. At this point, the method may stop or ignore the initiated power sequence. If the output of the logic module is equal to one or a logical high signal, then the "YES" branch is taken, and the method proceeds to decision block 755. If the output of the logic module is not equal to one or a logical high signal, then the "NO" branch is taken and the method proceeds to block 707.

At decision block 755, the method determines whether the magnetic sensor signal is equal to one or a logical high signal. If the magnetic sensor signal is equal to one or is a logical high signal, then the "YES" branch is taken and the method proceeds to block 750. If the magnetic sensor signal is not equal to one or not equal to a logical high signal, then the "NO" branch is taken and the method proceeds to block 745. At block 750, the method may complete a power-up sequence. The power-up sequence may have been initiated earlier based on the output of the logic module. At this point, the method may determine that signal from the magnetic sensor is not spurious. Thus, the method may complete the power-up sequence. The method may proceed to block 707.

At block 745, the method may complete the power-down sequence. The power-down sequence may have been initiated earlier based on the output of the logic module. Similar to block 750, at this point, the method may determine that signal from the magnetic sensor is not spurious. Thus, the method may complete the power-down sequence. The method may proceed to block 707.

The information handling system disclosed herein implements a method in conjunction with accelerometers and gyroscopes to configure a variety of system attributes based on the information provided. It should be appreciated that wherein two accelerometers and one gyroscope are illustrated in the figures, one or more can be utilized depending on the operations desired.

Although FIG. 6, and FIG. 7 show example blocks of method 600 and method 700 in some implementation, method 600 and method 700 may include additional blocks, fewer blocks, different blocks, or differently arranged blocks than those depicted in FIG. 6 and FIG. 7. Those skilled in the art will understand that the principles presented herein may be implemented in any suitably arranged processing system. Additionally, or alternatively, two or more of the blocks of method 600 and method 700 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded in a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
monitoring an information handling system, by a processor, to detect a transition of a signal from a magnetic sensor, wherein the transition of the signal from the magnetic sensor indicates a change in a state of a lid of the information handling system from a first state to a second state;
in response to detecting the transition of the signal, determining, by an embedded controller, an angle of the lid based on information from an inertial sensor, wherein the angle of the lid is used to determine a lid state flag;

confirming, by the embedded controller, whether the lid is at the second state based on an output of a logic module, that takes the lid state flag from the inertial sensor and the signal from the magnetic sensor as inputs, wherein the output of the logic module is a logical high signal; and in response to the logical high signal as the output of the logic module, performing a power sequence.

2. The method of claim 1, further comprising in response to determining that the lid remains in the first state, stopping the power sequence.

3. The method of claim 1, wherein the confirming of whether the lid is at the second state fails when the output of the logic module is a logical low signal.

4. The method of claim 1, wherein the output of the logic module is transmitted to the embedded controller.

5. The method of claim 3, wherein the power sequence is based on the output of the logic module.

6. The method of claim 1, wherein the information used in determining the angle includes acceleration information from an accelerometer.

7. The method of claim 1, wherein the information used in determining the angle includes orientation and angular velocity information from a gyroscope.

8. The method of claim 1, wherein the power sequence is a power-down sequence.

9. The method of claim 1, wherein the power sequence is a power-up sequence.

10. An information handling system, comprising:

a processor; and a memory storing code that when executed causes the processor to perform operations including:

monitoring the information handling system to detect a transition of a signal from a magnetic sensor, wherein the transition of the signal from the magnetic sensor indicates a change of a lid of the information handling system from a first state to a second state;

in response to detecting the transition of the signal, determining, by an embedded controller, an angle of the lid based on information from an inertial sensor, wherein the angle of the lid is used to determine a lid state flag;

confirming whether the lid is at the second state based on an output of a logic module that takes the lid state flag from the inertial sensor and the signal from the magnetic sensor as inputs, wherein the output is a logical high signal; and in response to the logical high signal of the logic module, performing a power sequence.

11. The information handling system of claim 10, further comprising in response to determining that the lid remains in the first state, stopping the power sequence from continuing.

12. The information handling system of claim 10, wherein the the logical high signal of the output of the logic module is a result of both values of the lid state flag and the signal from the magnetic sensor are true.

13. The information handling system of claim 12, wherein the output of the logic module is transmitted to the embedded controller.

14. The information handling system of claim 12, wherein the power sequence is based on the output of the logic module.

15. The information handling system of claim 10, wherein the information used in the determining of the angle includes acceleration information from an accelerometer.

16. A non-transitory computer-readable medium to store instructions that are executable to perform operations comprising:

monitoring an information handling system to detect a transition of a signal from a magnetic sensor, wherein the transition of the signal from the magnetic sensor indicates a change in a lid of a portable information handling system from a first state to a second state;

in response to detecting the transition of the signal, determining, by an embedded controller, an angle of the lid based on information from an inertial sensor, wherein the angle of the lid is used to determine a lid state flag;

confirming whether the lid is at the second state based on an output of a logic module that takes the lid state flag based on the information from the inertial sensor and the signal from the magnetic sensor, wherein the output of the logic module is a logical high signal; and when output of the logical module is the logical high signal, then performing a power sequence.

17. The non-transitory computer-readable medium of claim 16, wherein the operations further comprising, in response to determining that the lid remains in the first state, stopping the power sequence from continuing.

18. The non-transitory computer-readable medium of claim 16, wherein the information used in the determining of the angle includes acceleration information from an accelerometer.

19. The non-transitory computer-readable medium of claim 16, wherein the information used in the determining of the angle includes orientation and angular velocity information from a gyroscope.

20. The non-transitory computer-readable medium of claim 16, wherein the power sequence is a power-up sequence.

* * * * *